United States Patent [19]

Biederstedt

[11] Patent Number: 5,108,053
[45] Date of Patent: Apr. 28, 1992

[54] MOUNTING BOARD, IN PARTICULAR FOR HOUSINGS OF THE TELECOMMUNICATION AND DATA TECHNOLOGY

[75] Inventor: Lutz Biederstedt, Berlin, Fed. Rep. of Germany

[73] Assignee: Krone Aktiengesellschaft, Berlin, Fed. Rep. of Germany

[21] Appl. No.: 668,190

[22] Filed: Mar. 12, 1991

[30] Foreign Application Priority Data

Mar. 13, 1990 [DE] Fed. Rep. of Germany ....... 9003083

[51] Int. Cl.⁵ ................................................ G12B 9/00
[52] U.S. Cl. .................................. 248/27.1; 439/559
[58] Field of Search ................................ 248/27.1, 27.3; 361/358, 359, 346; 439/545, 549, 552, 555, 562, 565, 567, 572

[56] References Cited

U.S. PATENT DOCUMENTS

| | | | |
|---|---|---|---|
| 3,806,721 | 4/1974 | Murphy | 248/27.1 X |
| 4,352,538 | 10/1982 | Fowler | 439/545 X |
| 4,389,021 | 6/1983 | Coldren | 439/545 |
| 4,406,510 | 9/1983 | Debortoli | 439/567 X |
| 4,541,036 | 9/1985 | Landries | 248/27.3 X |
| 4,580,859 | 4/1986 | Frano | 439/559 X |
| 4,647,129 | 3/1987 | Kandybowski | 439/559 X |
| 5,002,497 | 3/1991 | Plocek | 439/577 X |

FOREIGN PATENT DOCUMENTS

| | | | |
|---|---|---|---|
| 2603150 | 5/1976 | Fed. Rep. of Germany | 439/557 |
| 1216028 | 12/1970 | United Kingdom | 439/557 |
| 2104735 | 3/1983 | United Kingdom | 439/557 |

Primary Examiner—J. Franklin Foss
Attorney, Agent, or Firm—McGlew & Tuttle

[57] ABSTRACT

The invention relates to a mounting board (1) for receiving functional elements (8). In order to allow for an easy replacement of different functional elements (8). The mounting board is provided with cutouts (2), into which support elements can be inserted. The support elements (5, 25) accommodate the different functional elements (8) having different dimensions.

8 Claims, 2 Drawing Sheets

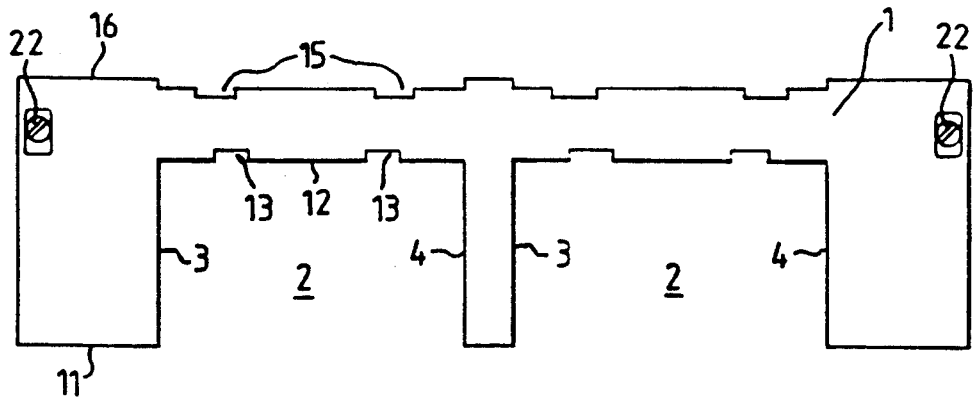
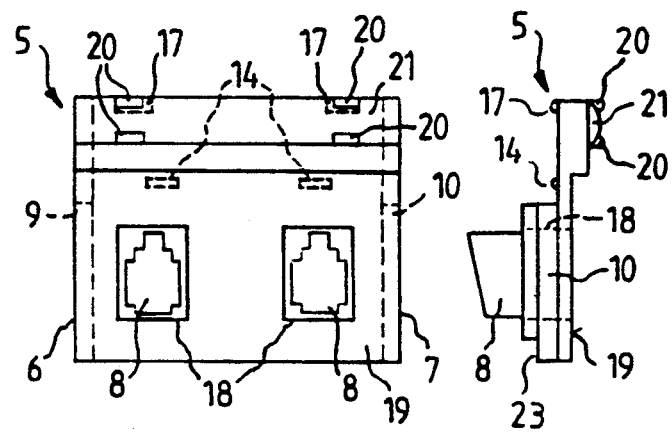
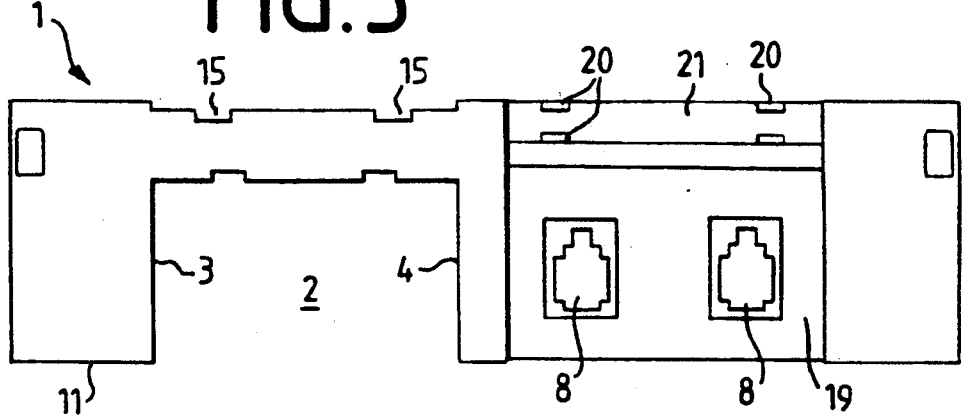

MOUNTING BOARD, IN PARTICULAR FOR HOUSINGS OF THE TELECOMMUNICATION AND DATA TECHNOLOGY

FIELD OF THE INVENTION

The invention relates to a mounting board for receiving functional elements, in particular for housing of telecommunications and data technology elements and components.

BACKGROUND OF THE INVENTION

Mounting boards and front panels for housings for the telecommunications and data technology are known in various embodiments. In the front panels, there are provided receiving openings for receiving different functional elements as, e.g., coaxial jacks, optical fiber jacks. The receiving openings being adapted in the outer dimensions to the respective functional element. It is disadvantageous with the mounting boards that when changing from one functional element to another one having different dimensions, the complete mounting board of the housing has to be replaced.

SUMMARY AND OBJECTS OF THE INVENTION

It is an objection of the invention to provide a mounting board, in particular for housings of the telecommunications and data technology, of the above mentioned type, wherein functional elements, in particular jacks, with different dimensions can be fastened in the mounting board, and wherein replacement of functional elements of different sizes is possible without any problems.

According to the invention, a mounting board, in particular for housing and supporting telecommunications and data technology components, is provided with cutouts. A support element is insertable into one of the cutouts for being supported by the mounting board. The support element in turn including receiving locations for accommodating functional elements for components. Thereby, support elements capable of accommodating functional elements with different dimensions, can be mounted in the cutouts as desired, and can be latched there. In case a functional element is to be replaced by another one having different dimensions, the support elements containing the first functional element is simply replaced by a support element containing a second functional element.

Further advantageous embodiments of the invention are characterized in that the cutout is open toward the side face of the mounting board allowing the support elements to be inserted laterally into the cutout. The support elements can be provided with guide grooves on the side for sliding into the mounting board, and the mounting board can include free spaces for engagement with latch elements correspondingly positioned on the support element. Another possible embodiment includes a holding frame on the rear side of the support element engagable into the cutout of the mounting board. Special attention should be directed to the embodiment according to the invention in which the cutout is open towards a side face of the mounting board, allowing the support elements to laterally insert in a simple manner into the mounting board.

A further object of the invention is to provide a mounting board and support element arrangement for supporting functional elements such as jacks, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a top view of a mounting board according to a first embodiment of the invention;

FIG. 2 is a top view of a first support element according to the invention;

FIG. 3 is a top view of the mounting board of FIG. 1 with inserted support elements;

DETAILED DESCRIPTION OF THE PREFERRED EMBODIMENT

Figure 4:
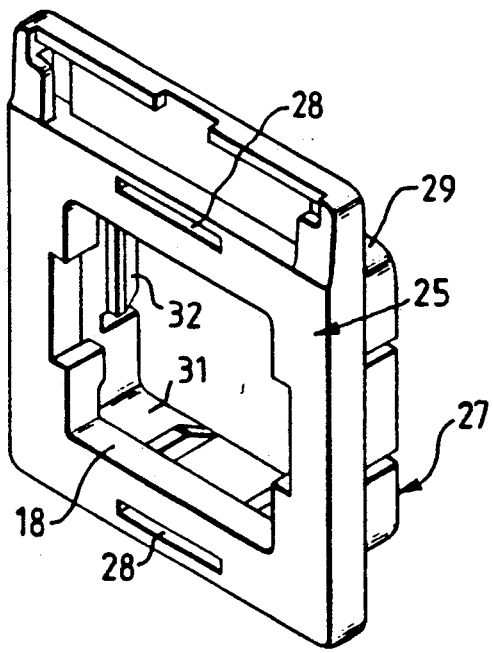
FIG. 4 is a perspective representation of a support element according to a second embodiment of the invention.

Referring to the drawings and in particular to FIG. 1, the invention includes a mounting board 1 which comprises substantially a rectangular metal plate, which can also be made from plastic. In the first embodiment, two rectangular cutouts 2 are provided. Each cutout 2 comprises a free space extending up to a side face 11 of the mounting board 1. This cutout 2 is open toward this side face 11. The narrow sides 3, 4 of the cutout 2 serve as guides, and are received in guide grooves 9, 10 of a support element 5, as will be explained below in detail. The longitudinal side 12 is provided with free spaces or slots 13, into which snap the latch elements 14 of the support element 5. Further, the mounting board 1 comprises free spaces or slots 15 at the external longitudinal side 16, into which also snap latch elements 17 of the support element 5, as will be explained below.

In FIG. 2 the support element 5 is shown, and comprises a rectangular metal plate body or a plate body made of plastic. The support element 5 is provided with an external contour adapted to the internal contour of the cutout 2. In the support element 5 there are provided free spaces, into which jacks 18 are snapped in. At the narrow sides 6, 7 of the support element 5 there are formed guide grooves 9 and 10. The bottom side 23 of the support element 5 is provided with latch elements 14 and 17. At the top side 19, holding brackets 20 are disposed for fixing a label 21.

In FIG. 3, the support element 5 is introduced into the mounting board 1. The narrow sides 3 and 4 of the cutout 2 of the mounting board 1 engage into the guide grooves 9, 10 of the support element 5. In the final position, the latch elements 14 of the support element 5 snap into the free spaces 13 of the mounting board 1, and the latch elements 17 of the support element snap into the free space 15 of the mounting board 1, such that the support element 5 is attached rigidly to the mounting board 1. Removing of the support element 5 is possible by delocking the latch elements 17.

The mounting board 1 can be fixed to a not shown frame or to a housing body by means of screws 22.

Should, instead of the jack 18, another functional element be required, e.g. a coaxial jack, a different support element 5 is placed into the cutout 2 of the mounting board 1, the coaxial jack being fixed already to this different support element.

In FIG. 4, a second embodiment of a support element 25 is shown. The support element 25 comprises a rectangular housing body, in the center of which a free space is provided. Into the free space is inserted the not shown functional element, which is, e.g., a coaxial jack, an optical fiber jack or other functional element. At the internal side 31 of the holding frame 27 are provided two latch segments 32, which hold the inserted functional elements in clamping manner.

Figure 5:
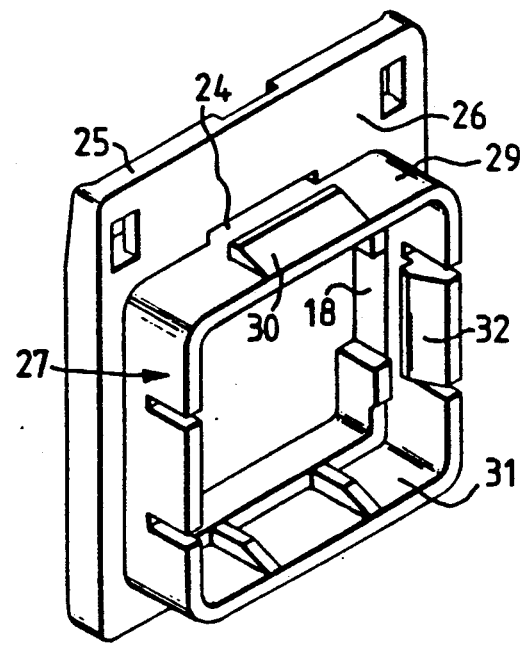
FIG. 5 is a rear view according to the arrangement of FIG. 4.

As is shown in FIG. 5, the support element 25 includes at the rear side 26 a holding frame 27. The holding frame 27 is connected with the support element 25 over clamping pieces 24 engaging into openings 28 of the support element 25. The holding frame 27 has at the external side 29 two latch segments 30 directed toward the outside. These latch segments engage behind the not shown mounting board 1 when inserting the support element 25, and thereby fix the support element 25 at the mounting board 1. The mounting board 1 is, for this purpose, provided with a cutout 2 having a rectangular shape according to the holding frame 27.

Several of the support elements 25 can, therefore, be disposed in a mounting board 1 provided with cutouts 2, the support elements 25 being capable to accommodate different functional elements.

While specific embodiments of the invention have been shown and described in detail to illustrate the application of the principles of the invention, it will be understood that the invention may be embodied otherwise without departing from such principles.

What is claimed is:

1. A mounting board arrangement for receiving functional elements for use with housings of telecommunications and data technology arrangements, comprising: a mounting board defining at least one cutout; a plurality of different types of support elements, each of said plurality of different types of support elements incorporating different types of function elements, all of said plurality of different types of support elements positionable in said cutout of said mounting board, said plurality of different types of support elements including means defining regions for supporting and accommodating functional elements.

2. A mounting board according to claim 1, wherein said cutout is open toward a side face of said mounting board, thereby allowing said plurality of different types of support elements to be inserted laterally into said cutouts.

3. A mounting board according to claim 1, wherein guide grooves are provided at the narrow sides of said plurality of different types of support elements.

4. A mounting board according to claim 1, wherein said mounting board includes free spaces, and said plurality of different type of support elements includes snap latch elements positionable into said free spaces when one of said plurality of different types of support elements is positioned in said cutout.

5. A mounting board according to claim 1, wherein said plurality of different types of support elements includes a rear side with a holding frame for fixing said plurality of different types of support elements to said mounting board.

6. A mounting board arrangement for receiving functional elements, the arrangement comprising:
a mounting board defining a cutout, said cutout being defined on three sides by said mounting board, said mounting board also defining slots, said slots being of a first and second type, said first type of slot opening to said cutout and said second type of slot opening to a side of said mounting board, said side of said mounting board being opposite said cutout; and
a plurality of different types of support elements, each type of said plurality of different types of support elements incorporating different types of the functional elements, all of said plurality of different types of support elements are of a size to fit into said cutout, and having grooves on opposite sides for receiving sides of said cutout, and for sliding said plurality of different types of support elements into said cutout, said plurality of different types of support elements having a first and second type of latches, said first type of latch being engagable with said first type of slot and said second type of latch being engagable with said second type of slot, said first and second latches and slots holding said plurality of different types of support elements in said mounting board.

7. A mounting board arrangement for receiving functional elements, the arrangement comprising:
a mounting board defining a cutout; and
a plurality of different types of support elements larger than said cutout, each type of said plurality of different types of support elements defining a free space for accommodating and supporting one type of the functional elements, said plurality of different types of support elements having internal latches for engaging with the functional elements, said plurality of different types of support elements having a holding frame of a size insertable into said cutout, said holding frame having latches that engage with said cutout of said mounting board for holding said plurality of different types of support elements to said mounting board.

8. A mounting board arrangement in accordance with claim 6, wherein:
said plurality of different types of support elements have holding brackets which extend over said mounting board when said plurality of different types of support elements are inserted into said mounting board, said holding brackets defining an area for the insertion of a label; and
said first and second type of latches being mounted opposite said holding brackets.

* * * * *